United States Patent
Nihei et al.

(10) Patent No.: US 7,998,006 B2
(45) Date of Patent: Aug. 16, 2011

(54) SPEED RATIO CONTROL DEVICE AND METHOD FOR BELT TYPE CONTINUOUSLY VARIABLE TRANSMISSION

(75) Inventors: Hironori Nihei, Zama (JP); Tetsuya Izumi, Yokohama (JP); Seonjae Kim, Seoul (KR); Fumito Shinohara, Atsugi (JP); Kiyotaka Sawano, Hiratsuka (JP); Takuya Numata, Fuji (JP)

(73) Assignee: Jatco Ltd, Fuji-shi (JP)

( * ) Notice: Subject to any disclaimer, the term of this patent is extended or adjusted under 35 U.S.C. 154(b) by 773 days.

(21) Appl. No.: 11/540,513

(22) Filed: Oct. 2, 2006

(65) Prior Publication Data

US 2007/0082770 A1   Apr. 12, 2007

(30) Foreign Application Priority Data

Oct. 6, 2005   (JP) .................. 2005-293733

(51) Int. Cl.
*F16H 59/00* (2006.01)
*F16H 61/00* (2006.01)

(52) U.S. Cl. ............... 474/18; 474/28; 474/46; 474/69; 474/70; 474/75; 474/80; 477/37; 477/44; 477/45; 477/46; 701/56; 701/60; 701/61

(58) Field of Classification Search .............. 474/80, 474/69–70; 477/44–46
See application file for complete search history.

(56) References Cited

U.S. PATENT DOCUMENTS

| | | | |
|---|---|---|---|
| 5,199,399 A | | 4/1993 | Shibuya |
| 5,871,416 A | * | 2/1999 | Sawada et al. .............. 477/47 |
| 5,890,991 A | * | 4/1999 | Sakakiyama .............. 477/48 |
| 6,219,608 B1 | * | 4/2001 | Abo et al. .............. 701/51 |
| 6,549,839 B2 | * | 4/2003 | Katakura et al. .............. 701/54 |
| 6,574,541 B2 | * | 6/2003 | Katakura et al. .............. 701/54 |
| 2001/0011051 A1 | * | 8/2001 | Hattori et al. .............. 477/121 |
| 2001/0046911 A1 | * | 11/2001 | Taniguchi et al. .............. 474/18 |
| 2004/0127330 A1 | * | 7/2004 | Sawada et al. .............. 477/44 |
| 2004/0171445 A1 | * | 9/2004 | Yamamoto et al. .............. 474/28 |
| 2004/0209719 A1 | * | 10/2004 | Ochiai et al. .............. 474/18 |

FOREIGN PATENT DOCUMENTS

| | | |
|---|---|---|
| EP | 1 394 444 A2 | 3/2004 |
| EP | 1 471 289 A2 | 10/2004 |
| JP | 8-277895 A | 10/1996 |
| JP | 2000-002322 A | 1/2000 |

* cited by examiner

*Primary Examiner* — Robert Siconolfi
*Assistant Examiner* — San Aung
(74) *Attorney, Agent, or Firm* — Foley & Lardner LLP

(57) ABSTRACT

In a speed ratio control device for a belt continuously variable transmission according to this invention, when a speed ratio is subjected to feedback control on the basis of a difference between an actual speed ratio and a target speed ratio, pressure supplied to a primary pulley is corrected through feedforward (S17, S18) in order to suppress variation in the groove width of the primary pulley caused by a rapid variation in an input torque into the primary pulley (S17) while traveling in a fixed speed ratio mode (S14) in which the target speed ratio is held at a fixed value.

6 Claims, 5 Drawing Sheets

SPEED RATIO CONTROL DEVICE AND METHOD FOR BELT TYPE CONTINUOUSLY VARIABLE TRANSMISSION

FIELD OF THE INVENTION

This invention relates to a technique for preventing the deviation of an actual speed ratio from a target speed ratio in a speed ratio control device for a belt continuously variable transmission.

BACKGROUND OF THE INVENTION

A belt continuously variable transmission in which the rotation speed of an input shaft connected to a drive source is varied continuously and transmitted to an output shaft is known. A belt continuously variable transmission is constituted by a primary pulley, a secondary pulley, and a belt wrapped around the two pulleys, and by varying the width of the two pulleys using oil pressure, the radius of contact between the belt and pulleys is varied, leading to variation in the speed ratio. JP2000-02322β published by the Japan Patent Office in 2000 discloses control of the speed ratio in terms of feedback control to align the actual speed ratio with a target speed ratio corresponding to driving conditions.

SUMMARY OF THE INVENTION

A continuously variable transmission may have a so-called manual mode which is capable of fixing the speed ratio, and when the manual mode is set, the speed ratio is fixed at a constant speed ratio regardless of driving conditions such as the vehicle speed and rotation speed. If a driver suddenly releases the accelerator pedal while traveling in the manual mode, the engine torque falls, and as a result, a primary pressure, which is the oil pressure supplied to the primary pulley, becomes excessive, causing the speed ratio to deviate to a high side and the engine rotation speed to fall.

If feedback control is performed immediately afterward to align the speed ratio that has deviated to the high side with the target speed ratio, the speed ratio returns to a low side and the engine rotation speed rises. With this conventional technique, the engine rotation speed rises after the accelerator pedal is released, giving the driver a sense of discomfort.

An object of this invention is to suppress variation in the engine rotation speed occurring when a driver releases an accelerator pedal while traveling in a fixed speed ratio mode.

In order to achieve the above object, this invention provides a speed ratio control device for a belt continuously variable transmission in which a belt is wrapped around a primary pulley connected to an input side of a vehicle drive system and a secondary pulley connected to an output side, a groove width of the primary pulley and the secondary pulley is varied by controlling an oil pressure supplied by a hydraulic pump, and a speed ratio is varied in accordance with the groove width. The speed ratio control device comprises a controller which calculates a target speed ratio on the basis of a driving condition of a vehicle, feedback-controls the speed ratio on the basis of a difference between an actual speed ratio and the target speed ratio, and corrects the pressure supplied to the primary pulley through feedforward in order to suppress a variation in the groove width of the primary pulley caused by a rapid variation in an input torque into the primary pulley occurring while traveling in a fixed speed ratio mode in which the target speed ratio is held at a fixed value.

According to this invention, the pressure supplied to the primary pulley is corrected through feedforward in order to suppress variation in the groove width of the primary pulley when a driver suddenly releases or presses an accelerator pedal while traveling in the fixed speed ratio mode, and hence variation in the speed ratio occurring at the time of a rapid variation in the input torque into the primary pulley can be suppressed, enabling suppression of variation in the engine rotation speed when the speed ratio is returned to the target speed ratio by means of feedback control.

The details as well as other features and advantages of this invention are set forth in the remainder of the specification and are shown in the accompanying drawings.

DESCRIPTION OF THE PREFERRED EMBODIMENTS

An embodiment of this invention will be described in detail below with reference to the drawings.

Figure 1:
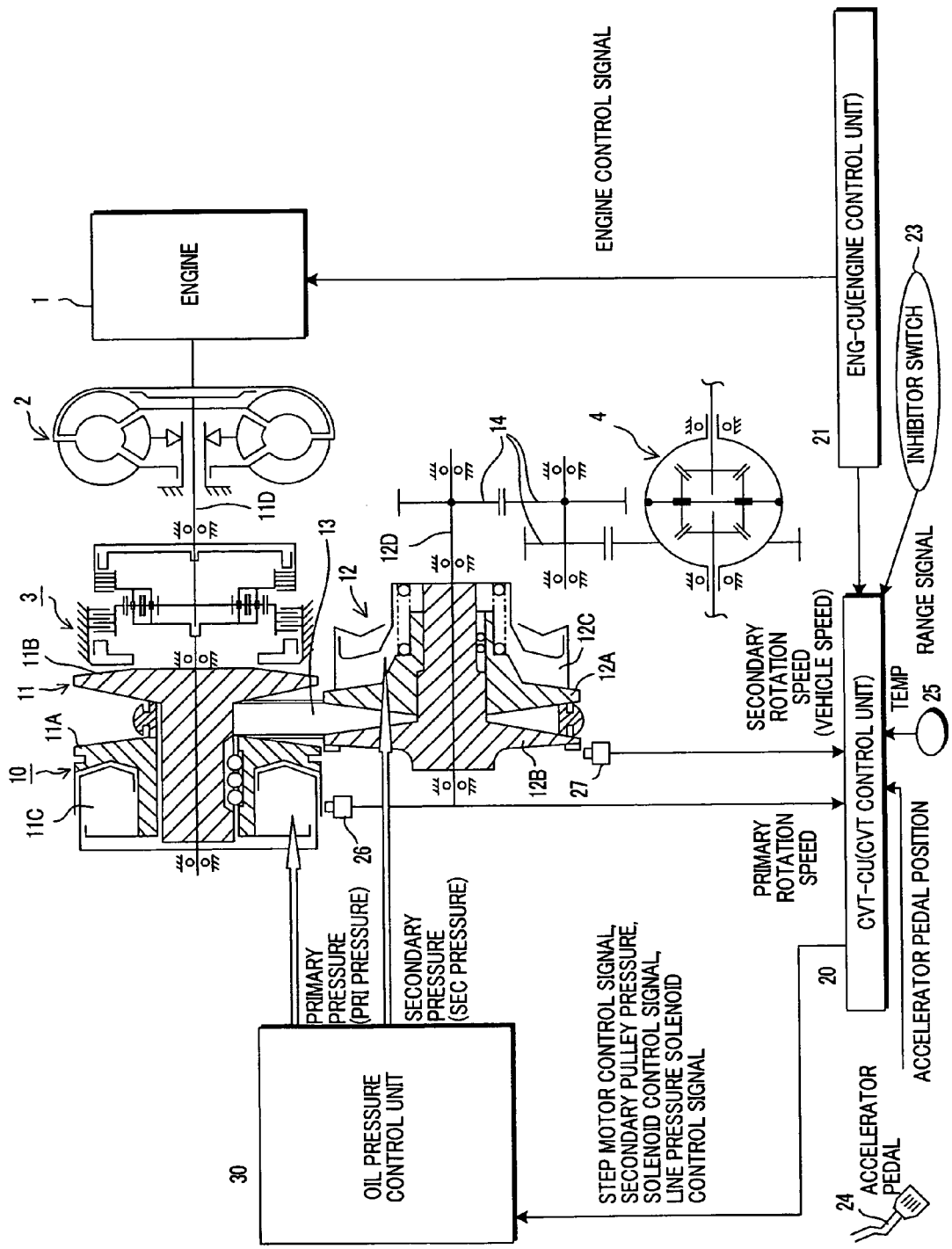
FIG. 1 is a schematic diagram showing a speed ratio control device for a belt continuously variable transmission according to this embodiment.

FIG. 1 is a schematic diagram showing a speed ratio control device for a belt continuously variable transmission according to this embodiment. A belt continuously variable transmission 10 comprises a primary pulley 11, a secondary pulley 12, a V belt 13, a CVT control unit 20 (CVTCU hereafter), and an oil pressure control unit 30.

The primary pulley 11 is an input shaft side pulley which inputs the rotation of an engine 1 into the belt continuously variable transmission 10. The primary pulley 11 comprises a fixed conical plate 11b which rotates integrally with an input shaft 11d, and a movable conical plate 11a which is disposed opposite the fixed conical plate 11b to form a V-shaped pulley groove, and which can be displaced axially by oil pressure acting on a primary pulley cylinder chamber 11c. The primary pulley 11 is connected to the engine 1 via a forward-reverse switching mechanism 3 and a torque converter 2 comprising a lockup clutch, and inputs the rotation of the engine 1. The rotation speed of the primary pulley 11 is detected by a primary pulley rotation speed sensor 26.

The V belt 13 is wrapped around the primary pulley 11 and secondary pulley 12 such that the rotation of the primary pulley 11 is transmitted to the secondary pulley 12.

The secondary pulley 12 outputs the rotation transmitted by the V belt 13 to a differential 4. The secondary pulley 12 comprises a fixed conical plate 12b which rotates integrally with an output shaft 12d, and a movable conical plate 12a which is disposed opposite the fixed conical plate 12b to form a V-shaped pulley groove, and which can be displaced axially in accordance with oil pressure acting on a secondary pulley cylinder chamber 12c. It should be noted that a pressure-receiving surface area of the secondary pulley cylinder chamber 12c is set substantially equally to the pressure-receiving surface area of the primary pulley cylinder chamber 11c.

The secondary pulley 12 is connected to the differential 4 via an idler gear 14 and an idler shaft, and outputs the rotation to the differential 4. The rotation speed of the secondary pulley 12 is detected by a secondary pulley rotation speed sensor 27. The vehicle speed may be calculated from the rotation speed of the secondary pulley 12.

The CVTCU 20 determines the speed ratio (a value obtained by dividing the effective radius of the secondary pulley 12 by the effective radius of the primary pulley 11) and a contact frictional force on the basis of signals from an inhibitor switch 23, an accelerator pedal position sensor 24, an oil temperature sensor 25, the primary pulley rotation speed sensor 26, the secondary pulley rotation speed sensor 27, and so on, as well as input torque information from an engine control unit 21, and controls the belt continuously variable transmission 10 by transmitting commands to the oil pressure control unit 30.

The oil pressure control unit 30 operates on the basis of the commands from the CVTCU 20. The oil pressure control unit 30 causes the movable conical plate 11a and the movable conical plate 12a to move in a rotary axis direction by controlling the oil pressure supplied to the primary pulley 11 and secondary pulley 12.

When the movable conical plate 11a and the movable conical plate 12a move, the pulley groove width varies. As a result, the V belt 13 moves over the primary pulley 11 and secondary pulley 12. Thus, the contact radius of the V belt 13 relative to the primary pulley 11 and secondary pulley 12 varies, whereby the speed ratio and the contact frictional force of the V belt 13 are controlled.

The rotation of the engine 1 is input into the belt continuously variable transmission 10 via the torque converter 2 and the forward-reverse switching mechanism 3, and transmitted from the primary pulley 11 to the differential 4 via the V belt 13 and secondary pulley 12.

When the accelerator pedal is depressed or a shift change is performed in a manual mode, the movable conical plate 11a of the primary pulley 11 and the movable conical plate 12a of the secondary pulley 12 are axially displaced, thereby varying the contact radius thereof with the V belt 13 such that the speed ratio is varied continuously.

Figure 2:
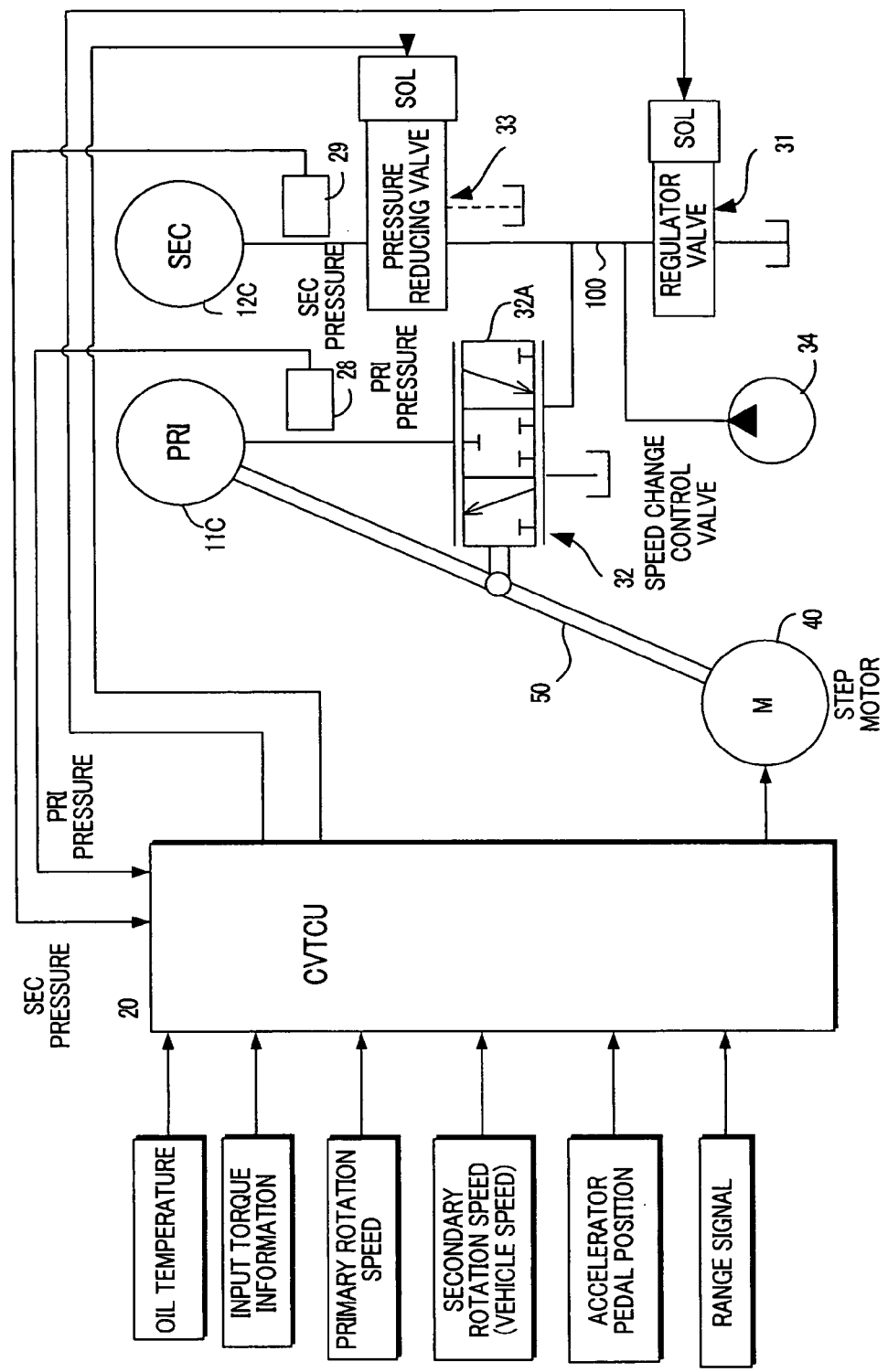
FIG. 2 is a schematic diagram of an oil pressure control unit and a CVTCU.

FIG. 2 is a schematic diagram of the oil pressure control unit and the CVTCU.

The oil pressure control unit 30 comprises a regulator valve 31, a speed change control valve 32, and a pressure reducing valve 33. The oil pressure control unit 30 controls the oil pressure supplied by a hydraulic pump 34, and supplies the oil pressure to the primary pulley 11 and secondary pulley 12.

The regulator valve 31 is a pressure regulating valve which comprises a solenoid and regulates the pressure of the oil pumped by the hydraulic pump 34 to a predetermined line pressure in accordance with a command (for example, a duty signal or the like) from the CVTCU 20 and in accordance with the driving conditions.

The speed change control valve 32 is a control valve which controls the oil pressure (primary pressure hereafter) in the primary pulley cylinder chamber 11c to a desired target pressure. The speed change control valve 32 is connected to a servo link 50 constituting a mechanical feedback mechanism. The speed change control valve 32 is driven by a step motor 40 connected to one end of the servo link 50, and receives feedback regarding the groove width, or in other words the actual speed ratio, from the movable conical plate 11a of the primary pulley 11, which is connected to the other end of the servo link 50. The speed change control valve 32 regulates the primary pressure by absorbing and discharging the oil pressure of the primary pulley cylinder chamber 11c in accordance with the displacement of a spool 32a, thereby realizing a target speed ratio which is instructed according to a drive position of the step motor 40, and when the speed change is actually complete, the speed change control valve 32 receives the displacement from the servo link 50 and holds the spool 32a in a closed position. Here, the speed change control valve 32 and servo link 50 constitute feedback control means.

The pressure reducing valve 33 is a control valve which comprises a solenoid and controls the pressure (secondary pressure hereafter) that is supplied to the secondary pulley cylinder chamber 12c to a desired target pressure.

The line pressure supplied by the hydraulic pump 34 and regulated by the regulator valve 31 is supplied to the speed change control valve 32 and the pressure reducing valve 33, respectively.

The speed ratio of the primary pulley 11 and secondary pulley 12 is controlled by the step motor 40 which is driven in accordance with a speed change command signal from the CVTCU 20. The spool 32a of the speed change control valve 32 is driven in accordance with the displacement of the servo link 50, which operates in conjunction with the step motor 40, and thus the line pressure supplied to the speed change control valve 32 is regulated such that the primary pressure is supplied to the primary pulley 11. Hence, the groove width is variably controlled and set to a predetermined speed ratio.

The CVTCU 20 variably controls the speed ratio and the contact frictional force of the V belt 13 by reading a range signal from the inhibitor switch 23, an accelerator pedal position from the accelerator pedal position sensor 24, an oil temperature of the belt continuously variable transmission 10 from the oil temperature sensor 25, signals from the primary pulley speed sensor 26, secondary pulley speed sensor 27, oil pressure sensors 28, 29, and so on. It should be noted that the oil pressure sensor 28 is a sensor which detects the primary pressure applied to the primary pulley cylinder chamber 11c, while the oil pressure sensor 29 is a sensor which detects the secondary pressure applied to the secondary pulley cylinder chamber 12c.

The CVTCU 20 determines a target speed ratio in accordance with the vehicle speed, throttle opening, and so on, and drives the step motor 40 to control the current speed ratio toward the target speed ratio. The CVTCU 20 also determines a target line pressure value from the input torque information, speed ratio, and oil temperature, controls the line pressure by driving the solenoid of the regulator valve 31, determines a target value for the secondary pressure, and controls the secondary pressure through feedback control by driving the solenoid of the pressure reducing valve 33 in accordance with the detected value of the oil pressure sensor 28 and the target value.

Figure 3:
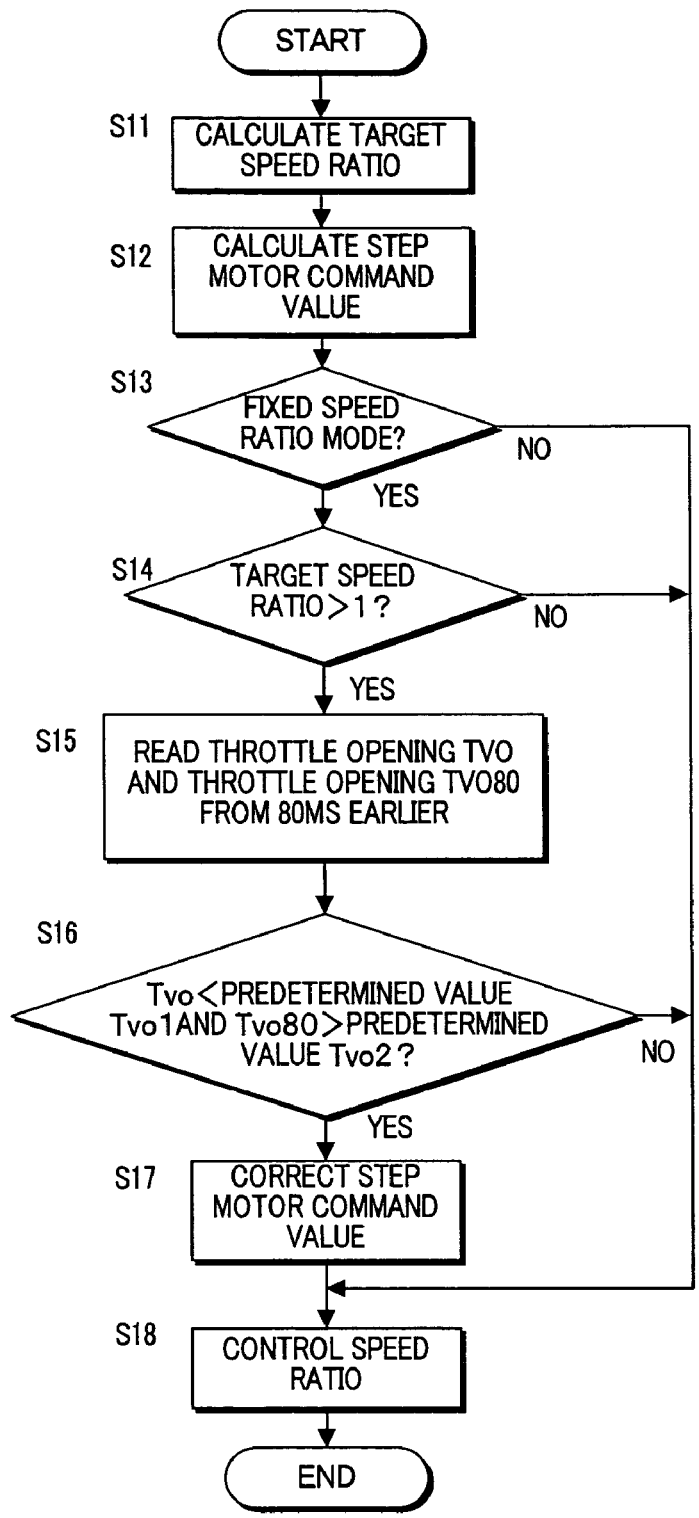
FIG. 3 is a flowchart showing control of the speed ratio control device for a belt continuously variable transmission according to this embodiment.

The control performed by the CVTCU 20 will be described below with reference to the flowchart in FIG. 3. It should be noted that this control is performed repeatedly at short intervals (of 10 ms, for example).

In a step S11 (target speed ratio calculating means), the target speed ratio is calculated. The target speed ratio is calculated on the basis of the vehicle speed, the engine rotation speed, the accelerator pedal position, and so on. The vehicle speed and engine rotation speed may be determined from the rotation speed of the primary pulley 11 and the rotation speed of the secondary pulley 12, respectively. It should be noted that when the operating mode of the transmission 10 is set in a fixed speed ratio mode, the target speed ratio takes a fixed value. Here, in the fixed speed ratio mode the speed ratio is fixed, regardless of driving conditions such as the vehicle speed and engine rotation speed, and corresponds to a low mode, manual mode, or similar, for example.

In a step S12, a step motor drive position command value for realizing the target speed ratio is calculated on the basis of the target speed ratio.

In a step S13, a determination is made as to whether or not the operating mode of the transmission 10 is the fixed speed ratio mode. If so, the routine advances to a step S14, and if not, the routine advances to a step S18.

In the step S14, a determination is made as to whether or not the target speed ratio is higher than 1. If the target speed ratio is higher than 1, the routine advances to a step S15, and if the target speed ratio is equal to or less than 1, the routine advances to the step S18.

In the step S15, a throttle opening Tvo and a throttle opening Tvo80 from 80 ms earlier are read.

In a step S16, a determination is made as to whether or not the throttle opening Tvo is smaller than a predetermined value Tvo1 and the throttle opening from 80 ms earlier is larger than a predetermined value Tvo2. When the determination conditions are established, the routine advances to a step S17, and when the determination conditions are not established, the routine advances to the step S18. In this step, a determination is made as to whether or not the throttle opening has shifted from being greater than the predetermined value Tvo2 to being smaller than the predetermined value Tvo1 within 80 ms, and thus it is possible to determine whether or not a driver has suddenly released the accelerator pedal. The predetermined value Tvo2 is a larger value than the predetermined value Tvo1, and both the predetermined value Tvo1 and the predetermined value Tvo2 are determined in advance through experiment or the like to enable a determination to be made regarding sudden release of the accelerator by the driver.

In the step S17 (feedforward control means), a predetermined correction amount is added to the step motor drive position command value, whereby the drive position of the step motor is corrected to the low side. The added correction amount is returned to zero at a predetermined rate of reduction.

Here, the predetermined correction amount is set to a value which is capable of preventing the groove width of the primary pulley from increasing due to a reduction in the input torque of the primary pulley generated when the driver releases the accelerator suddenly, or in other words preventing the actual speed ratio from dropping greatly in relation to the target speed ratio, and is determined in advance through experiment or the like. The predetermined reduction rate is set such that the actual speed ratio can be converged with the target speed ratio gradually after the drop in the speed ratio has been suppressed by the predetermined correction amount, and is determined in advance through experiment or the like.

In the step S18, the speed ratio is controlled by controlling the drive position of the step motor 40 and a solenoid current supplied to the pressure reducing valve 33 on the basis of the step motor drive position command value and the target speed ratio.

Figure 4:
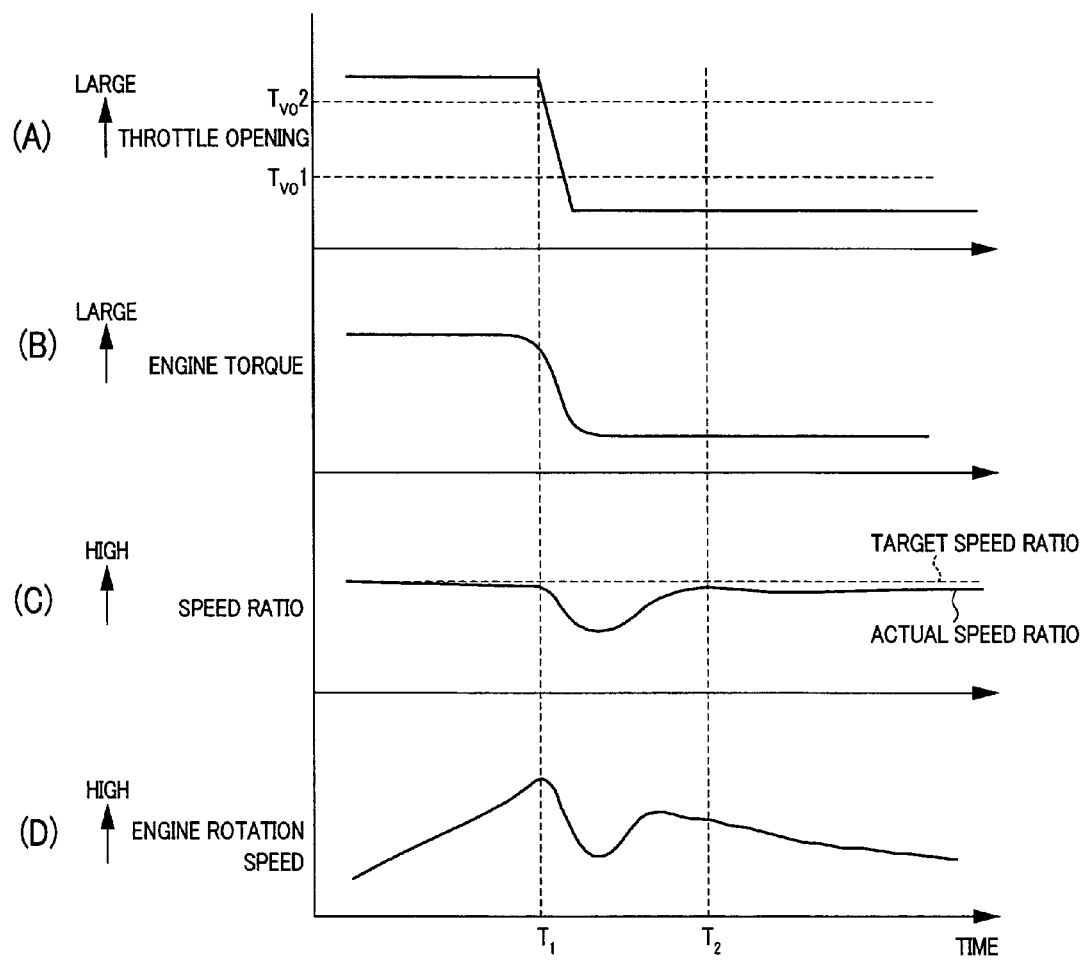
FIG. 4 is a time chart showing speed ratio control according to a conventional example.
Figure 5:
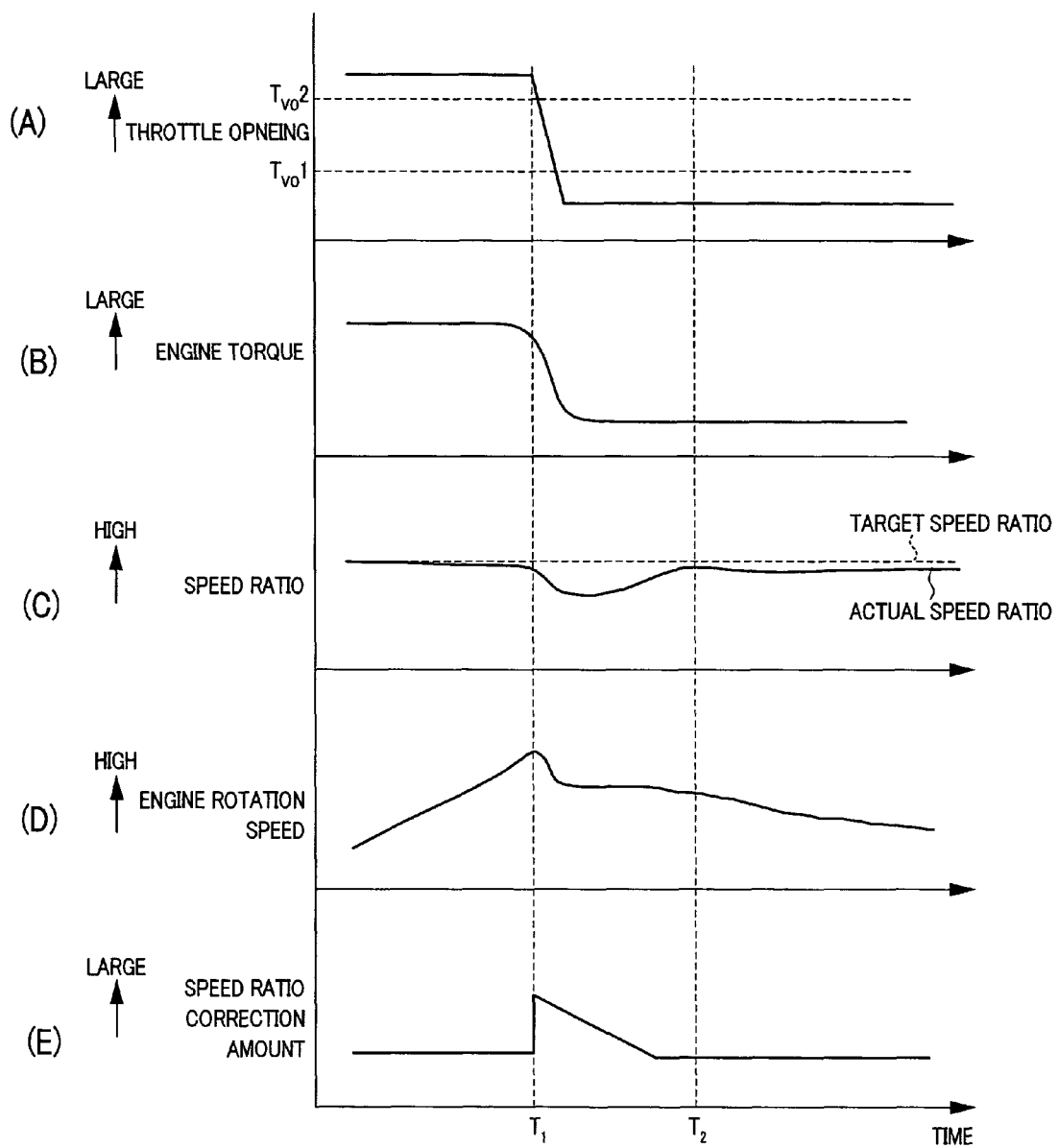
FIG. 5 is a time chart showing speed ratio control according to this embodiment.

Next, using FIGS. 4 and 5, the actions of this embodiment will be described. FIG. 4 is a time chart showing speed ratio control according to a conventional example, (a) showing the throttle opening, (b) showing the engine torque, (c) showing the speed ratio, and (d) showing the engine rotation speed. FIG. 5 is a time chart showing the actions of the speed ratio control device for a belt continuously variable transmission according to this embodiment, (a) showing the throttle opening, (b) showing the engine torque, (c) showing the speed ratio, (d) showing the engine rotation speed, and (e) showing the speed ratio correction amount. Both FIGS. 4 and 5 illustrate variation from a state occurring immediately after an increase in the throttle opening generated when the driver depresses the accelerator pedal while traveling with the operating mode of the transmission 10 set to the manual mode.

First, the conventional example will be described with reference to FIG. 4. As a result of the increase in the throttle opening, both the vehicle speed and the engine rotation speed rise.

When the driver suddenly releases the accelerator pedal at a time t1, the throttle opening falls rapidly, leading to a rapid decrease in the engine torque. Because of the decrease in engine torque, or in other words a decrease in the input torque that is input into the primary pulley, the primary pressure must be reduced in order to keep the speed ratio fixed. However, the speed change control valve 32 operates at a delay from the primary pressure command value, and hence the actual primary pressure decreases at a delay in relation to the command value. As a result, the actual speed ratio deviates to the high side, and the engine rotation speed falls in accordance with the variation in the speed ratio.

The speed ratio is feedback-controlled to the target speed ratio, and hence the actual speed ratio rises and returns to the target speed ratio at a time t2. Accordingly, the engine rotation speed rises, and even though the accelerator pedal has been released, the engine rotation speed rises. This causes the driver to feel a sense of discomfort.

Next, the actions of the speed ratio control device for a belt continuously variable transmission according to this embodiment will be described with reference to FIG. 5. As a result of the increase in the throttle opening, both the vehicle speed and the engine rotation speed rise.

When the driver suddenly releases the accelerator pedal at the time t1, the throttle opening falls rapidly, leading to a rapid decrease in engine torque. At this time, the throttle opening falls from a larger value than the predetermined value Tvo2 to a smaller value than the predetermined value Tvo1, and therefore the speed ratio is increased by the predetermined correction amount through feedforward. Thereafter, the speed ratio correction amount is reduced gradually at the predetermined reduction rate. As a result, the drop in the actual speed ratio is suppressed and an increase in the engine rotation speed caused by feedback control can be suppressed.

In this embodiment as described above, a predetermined correction amount is added to the speed ratio command value by means of feedforward when the driver suddenly releases the accelerator pedal while traveling in the fixed speed ratio mode, whereby the speed ratio command value is corrected to the low side. As a result, a drop in the speed ratio occurring when the input torque into the primary pulley 11 decreases can be suppressed, and an increase in the engine rotation speed when the speed ratio is returned to the target speed ratio by feedback control can be suppressed.

Furthermore, a decrease in the input torque into the primary pulley 11, or in other words a decrease in the engine torque, is determined by a decrease in the throttle opening, and hence a drop in the speed ratio can be determined earlier, enabling reliable suppression of variation in the engine rotation speed.

Moreover, when the speed ratio command value is corrected to the low side, the speed ratio is determined to be greater than 1, and hence control is not performed when the speed ratio is comparatively high, i.e. 1 or less, and engine torque variation is small even when the accelerator pedal is suddenly released. Accordingly, a situation in which the correction amount is added to the speed ratio needlessly such that the engine rotation speed shifts to an unintended rotation speed can be prevented.

This invention is not limited to the embodiment described above, and various alterations and modifications may be made within the technical scope thereof and considered equivalent to this invention.

For example, in this embodiment a case in which the driver releases the accelerator pedal suddenly was described, but this invention may also be applied to a case in which the accelerator pedal is suddenly depressed. In this case, the determination conditions of the step S16 in FIG. 3 are that the throttle opening Tvo be greater than the predetermined value Tvo2 and that the throttle opening Tvo80 from 80 ms earlier be smaller than the predetermined value Tvo1, thereby determining that the throttle opening has shifted from being smaller than the predetermined value Tvo1 to being larger than Tvo2 within 80 ms. Further, the speed ratio correction amount in the step S17 of FIG. 3 is reversed from positive to negative and from negative to positive in relation to the correction amount of this embodiment.

Furthermore, in this embodiment the start of control is determined on the basis of the throttle opening Tvo and the throttle opening Tvo80 from 80 ms earlier, but this invention is not limited to 80 ms earlier.

Moreover, a condition according to which a determination is made as to whether or not a value obtained by subtracting the actual speed ratio from the target speed ratio is larger than a predetermined value may be added to the determination conditions for correcting the step motor drive position command value in the step S17. In so doing, it is possible to judge with a higher degree of precision that the actual speed ratio is gradually falling away from the target speed ratio, and hence a drop in the actual speed ratio generated when the driver releases the accelerator pedal can be determined more reliably. As a result, an increase in the engine rotation speed immediately after a decrease in the input torque into the primary pulley 11 can be suppressed more reliably.

What is claimed is:

1. A speed ratio control device for a belt continuously variable transmission in which a belt is wrapped around a primary pulley connected to an input side of a vehicle drive system and a secondary pulley connected to an output side, a groove width of the primary pulley and the secondary pulley is varied by controlling an oil pressure supplied by a hydraulic pump, a speed ratio is varied in accordance with the groove width, and the transmission operates in a fixed speed ratio mode in which a target speed ratio is held at a fixed value, the device comprising a controller which:

calculates the target speed ratio on a basis of a driving condition of a vehicle;

feedback-controls the speed ratio on a basis of a difference between an actual speed ratio and the target speed ratio; and corrects pressure supplied to the primary pulley to a lower pressure by addition of a predetermined correction amount to the target speed ratio when an input torque into the primary pulley decreases rapidly while traveling in the fixed speed ratio mode in which the target speed ratio is held at the fixed value, and to a higher pressure by subtraction of the predetermined correction amount from the target speed ratio when the input torque into the primary pulley increases rapidly while traveling in the fixed speed ratio mode.

2. The speed ratio control device as defined in claim 1, wherein the controller corrects the pressure supplied to the primary pulley to a lower pressure in order to suppress a variation in the groove width of the primary pulley caused by a rapid decrease in the input torque into the primary pulley occurring when the target speed ratio is greater than 1 while traveling in the fixed speed ratio mode in which the target speed ratio is held at a fixed value, and corrects the pressure supplied to the primary pulley to a higher pressure in order to suppress a variation in the groove width of the primary pulley caused by a rapid increase in the input torque into the primary pulley occurring when the target speed ratio is greater than 1 while traveling in the fixed speed ratio mode.

3. A speed ratio control method for a belt continuously variable transmission in which a belt is wrapped around a primary pulley connected to an input side of a vehicle drive system and a secondary pulley connected to an output side, a groove width of the primary pulley and the secondary pulley is varied by controlling an oil pressure supplied by a hydraulic pump, a speed ratio is varied in accordance with the groove width, and the transmission operates in a fixed speed ratio mode in which a target speed ratio is held at a fixed value, comprising:

calculating the target speed ratio on a basis of a driving condition of a vehicle;

feedback-controlling the speed ratio on a basis of a difference between an actual speed ratio and the target speed ratio; and correcting pressure supplied to the primary pulley to a lower pressure by addition of a predetermined correction amount to the target speed ratio when an input torque into the primary pulley decreases rapidly while traveling in the fixed speed ratio mode in which the target speed ratio is held at the fixed value, and to a higher pressure by subtraction of the predetermined correction amount from the target speed ratio when the input torque into the primary pulley increases rapidly while traveling in the fixed speed ratio mode.

4. The speed ratio control method as defined in claim 3, wherein the action of correcting the pressure corrects the pressure supplied to the primary pulley to a lower pressure in order to suppress a variation in the groove width of the primary pulley caused by a rapid decrease in the input torque into the primary pulley occurring when the target speed ratio is greater than 1 while traveling in the fixed speed ratio mode in which the target speed ratio is held at a fixed value, and corrects the pressure supplied to the primary pulley to a higher pressure in order to suppress a variation in the groove width of the primary pulley caused by a rapid increase in the input torque into the primary pulley occurring when the target speed ratio is greater than 1 while traveling in the fixed speed ratio mode.

5. A speed ratio control device for a belt continuously variable transmission in which a belt is wrapped around a primary pulley connected to an input side of a vehicle drive system and a secondary pulley connected to an output side, a groove width of the primary pulley and the secondary pulley is varied by controlling an oil pressure supplied by a hydraulic pump, a speed ratio is varied in accordance with the groove width, and the transmission operates in a fixed speed ratio mode in which a target speed ratio is held at a fixed value, the device comprising:

target speed ratio calculating means for calculating the target speed ratio on a basis of a driving condition of a vehicle;

feedback control means for feedback-controlling the speed ratio on a basis of a difference between an actual speed ratio and the target speed ratio; and correcting means for correcting pressure supplied to the primary pulley to a lower pressure by addition of a predetermined correction amount to the target speed ratio when an input torque into the primary pulley decreases rapidly while traveling in the fixed speed ratio mode in which the target speed ratio is held at the fixed value, and to a higher pressure by subtraction of the predetermined correction amount from the target speed ratio when the input torque into the primary pulley increases rapidly while traveling in the fixed speed ratio mode.

6. The speed ratio control device as defined in claim 5, wherein the feedforward control means corrects the pressure supplied to the primary pulley to a lower pressure in order to suppress a variation in the groove width of the primary pulley caused by a rapid decrease in the input torque into the primary pulley occurring when the target speed ratio is greater than 1 while traveling in the fixed speed ratio mode in which the target speed ratio is held at a fixed value, and corrects the pressure supplied to the primary pulley to a higher pressure in order to suppress a variation in the groove width of the primary pulley caused by a rapid increase in the input torque into the primary pulley occurring when the target speed ratio is greater than 1 while traveling in the fixed speed ratio mode.

* * * * *